United States Patent [19]

Akwei

[11] 4,258,617
[45] Mar. 31, 1981

[54] SKEWER

[76] Inventor: Samuel A. Akwei, 135 E. Herman St., Philadelphia, Pa. 19144

[21] Appl. No.: 46,069

[22] Filed: Jun. 6, 1979

[51] Int. Cl.³ .................................................. A47J 37/04
[52] U.S. Cl. ..................................... 99/419; 99/421 A
[58] Field of Search .............................. 99/419, 421A

[56] References Cited

U.S. PATENT DOCUMENTS

| 2,191,226 | 2/1940 | Clem | 99/419 |
| 2,909,987 | 10/1959 | Crites | 99/419 |
| 2,935,013 | 5/1960 | Onori | 99/419 |
| 3,028,801 | 4/1962 | Watts | 99/419 |
| 3,742,840 | 7/1973 | Cogswell | 99/421 A |
| 3,745,910 | 7/1973 | Delamater | 99/419 |
| 4,126,086 | 11/1978 | Valade | 99/419 |

Primary Examiner—Stanley N. Gilreath
Assistant Examiner—Arthur O. Henderson
Attorney, Agent, or Firm—Steele, Gould & Fried

[57] ABSTRACT

This invention provides a novel skewer, for cooking shish kabobs or the like, made from plastic, and comprising two interfitted, but otherwise unconnected members, the interfitting connection joining the handle and the body of the skewer. The body of the skewer and the handle are therefore capable of some relative independent movement. The skewer may be used in connection with a novel method and recipe for preparing foods, in particular, baked shish kabobs, or the like, comprising the steps of coating the food with a dry cassava flour based batter, baking in the oven until warm, applying melted butter or cooking oil, and baking until done.

4 Claims, 2 Drawing Figures

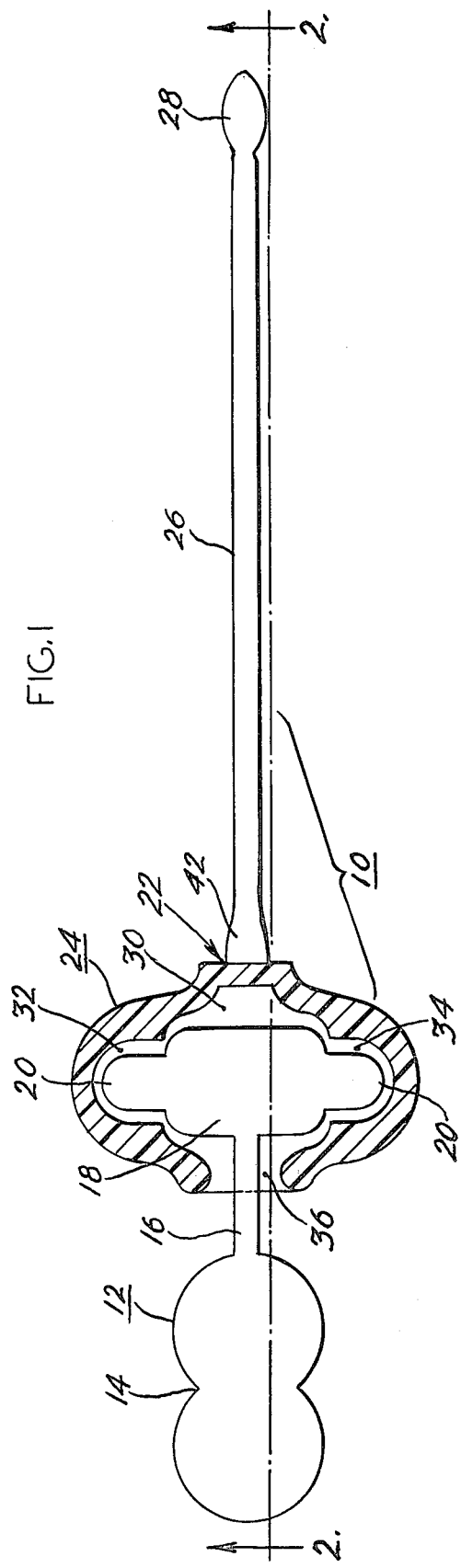
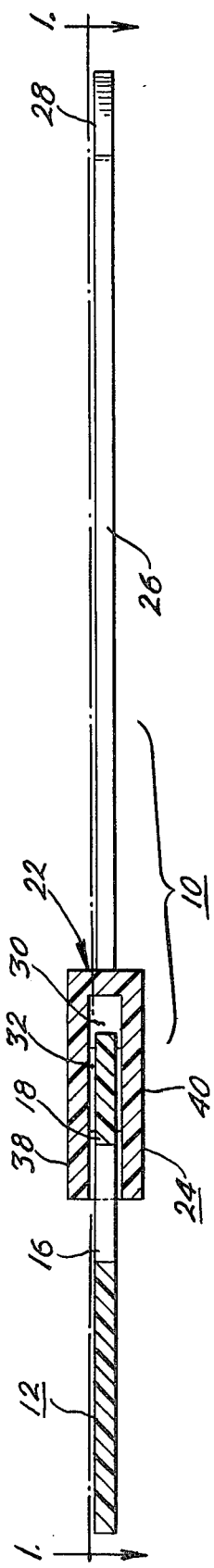

SKEWER

BACKGROUND OF THE INVENTION

1. Field of the Invention

This invention relates to the field of cooking, and cooking apparatus, and in particular, to a novel skewer for cooking shish kabobs or the like, and to a novel method and recipe for cooking foods, particularly shish kabobs or the like.

2. Prior Art

Skewers known in the art are made from metal, usually have sharp tips, and are often provided with wooden handles securely fitted to the metal body of the skewer. In significant contrast to the teachings of the prior art, a skewer is provided herein which is made from plastic material, does not have a sharp point, and has a handle which is interfitted with, but not otherwise connected to the body of the skewer, permitting some relative independent movement.

With respect to the method and recipe for cooking, the prior art teaches that when meats, poultry and seafood are to be prepared in conjunction with cooking oils or the like, as well as a wet or dry batter coating, the oil is either applied to the batter prior to any cooking or baking, or the meat is first browned fried in the oil, and the batter is then applied prior to further cooking. The recipe taught herein is novel in that the batter is based upon the use of cassava flour, rather than other kinds of flour. The method is novel in that a dry batter is applied first, and the food is baked until warm, usually requiring only 5 to 8 minutes at approximately 350° F. Only after the food has been warmed is the oil applied. The food is then cooked until done.

Both the skewer, the method and the recipe taught herein are clear departures from the teachings of the prior art.

SUMMARY OF THE INVENTION

It is an object of this invention to provide a novel apparatus for cooking foods.

It is another object of this invention to provide a novel skewer for cooking foods in the form of shish kabobs or the like.

It is still another object of this invention to provide a novel skewer for cooking shish kabobs or the like, which is made from plastic.

It is still another object of this invention to provide a novel skewer for cooking shish kabobs or the like, wherein the body of the skewer and the handle of the skewer are interfitted, but are not otherwise connected, permitting relative independent movement.

It is yet another object of this invention to provide a novel skewer for cooking shish kabobs or the like, which skewer is unsuitable for use as a weapon, and is less likely to be involved in accidental injuries.

It is yet another object of this invention to provide a novel method and recipe for preparing foods.

It is yet another object of this invention to provide a novel method and recipe for preparing meats, poultry and seafood.

It is yet another object of this invention to provide a novel method and recipe for preparing foods in the form of shish kabobs or the like.

It is yet another object of this invention to provide a novel method and recipe for preparing shish kabobs or the like, utilizing a batter comprising cassava flour and cooking oil or the like.

It is yet another object of this invention to provide a novel method and recipe for preparing shish kabobs or the like, wherein the cooking oil or the like is not applied to the food until after the batter has been applied, and the food has been cooked until warm.

These and other objects of this invention are accomplished by a novel skewer, wherein the handle and the main body of the skewer are interfitted, but not otherwise connected, thereby permitting relative independent movement. Other objects of this invention are accomplished by a method and recipe for preparing food, including meats, poultry and seafood, wherein a shish kabob or the like is first coated with a batter comprising cassava flour, is then cooked until warm, is then coated with cooking oil or the like, and is then cooked until done. The method and recipe results in the food being particularly soft and tender.

BRIEF DESCRIPTION OF THE DRAWINGS

For the purpose of illustrating the invention, there are shown in the drawings forms which are presently preferred; it being understood, however, that this invention is not limited to the precise arrangements and instrumentality shown.

FIG. 1 is a sectional view of a skewer according to this invention, taken along the line 1—1 of FIG. 2; and, FIG. 2 is a sectional view of a skewer according to this invention, taken along the line 2—2 of FIG. 1.

DETAILED DESCRIPTION OF PREFERRED EMBODIMENTS

A skewer, according to this invention, for use in cooking shish kabobs or the like, is shown in FIGS. 1 and 2. The skewer 10 comprises a handle assembly 12 and a skewer assembly 22. The handle assembly 12 comprises a gripping section 14, formed in a double circular shape, a shaft section 16 and an insert section 18. Insert section 18 is provided with two extending tabs or projections 20.

The skewer assembly 22 comprises a main body or spit bearing member 24 and a spit or skewer 26. Spit or skewer 26 is provided with a pointed tip 28. Spit bearing member 24 is provided with a cavity or hollow section 30, having side chambers 32 and 34, and opening 36.

The spit bearing member 24 of skewer assembly 22 is also provided with side covers 38 and 40, which cover cavity 30. It will be appreciated that although handle assembly 12 and skewer assembly 22 are interfitted, by reason of insert 18 being disposed within cavity 30, the two assemblies are nevertheless capable of some relative independent movement. This movement is primarily limited by the engagement of projections 20 with the sidewalls of side chambers 32 and 34. Notwithstanding the absence of a firm connection between the handle and skewer assemblies, the skewer 10 may nevertheless be used in any way that a normal skewer may be used, with one exception. The interfitting arrangement is such that the skewer may be pushed, pulled, lifted and turned over (rotated). However, at the same time, it is particularly unsuitable for use as a weapon and with its use, one is less susceptible to accidental injury.

Of further advantage is that the entire skewer may be constructed from plastics material, the material being such that it must withstand temperatures of approximately 450° F. Many such plastics are available, such as nylon. When so made from appropriate plastic material, the parts may be easily molded. In order to buttress the connection between the spit or skewer 26 and the spit bearing member 24, the connecting portion 42 of the spit 26 may be widened, as shown in FIG. 1. The skewer 26 need not be round, as are most conventional skewers, but may have a rectangular cross section as shown in the Figures.

The method and recipe for preparing food in accordance with this direction are novel in several aspects. With respect to the recipe, the basic ingredient for the food coating or dry batter is cassava flour. Use of a coating in which cassava flour is the main ingredient unexpectedly results in the food remaining particularly soft and tender, particularly with respect to known coatings.

With regard to the method, it is common practice, when preparing foods with a batter coating, dry or wet, and cooking fat or oil or melted butter or the like, to either apply the oil immediately over the coating, prior to cooking, or to fry or brown the food in the oil first and then apply the batter or coating. Unexpectedly delicious and tender results have been achieved by the methods of this invention, wherein the cooking method comprises the steps of first coating the surface of the food with a cassava flour based coating, cooking the food until warm, usually requiring approximately 5 to 8 minutes at a cooking temperature of approximately 325° F. to 400° F., applying the cooking oil after the food has been warmed, and then cooking until the food is done, the coating become brown and crispy. The recipe and method are suitable for use with all meats, including but not limited to beef, pork, lamb and venison. The method and recipe are also suitable for use with fowl and poultry, including but not limited to duck, goose, turkey, chicken and pheasant. The method and recipe are further suitable for use will manner of seafood, including but not limited to fish, shrimp, scallops and oysters.

The method and recipe may be vary effectively utilized when the food is cooked on a skewer, so as to be a shish kabob. The food, usually meat, is cut into cubes, and slipped onto the skewer, with various kinds of vegetables, such as tomatos, green peppers and onions being interspersed between the cubes of meat. The method and recipe also result in tender and tasty vegetables, when made in shish kabob fashion.

The following four examples are complete recipes for the preparation of various kinds of food, including beef, lamb, fish and shrimp, in accordance with this invention and the method described above.

EXAMPLE 1

Approximately 2.72 kilograms (approximately 6 lbs.) of boneless beef are used with:

| cassava flour | 102 | grams |
| salt | 25 | grams |
| crushed red pepper | 35 | grams |
| ground red pepper | 8 | grams |
| ground black pepper | 10 | grams |
| ground allspice | 15 | grams |
| melted butter or cooking oil | 50 | milliliters |

EXAMPLE 2

Approximately 2.72 kilograms of boneless lamb are used with:

| cassava flour | 100 | grams |
| crushed red pepper | 32 | grams |
| ground red pepper | 25 | grams |
| ground black pepper | 12 | grams |
| salt | 20 | grams |
| ground allspice | 17 | grams |
| melted butter or cooking oil | 40 | milliliters |

EXAMPLE 3

Approximately 2.72 kilograms of boneless fish are used with:

| cassava flour | 105 | grams |
| salt | 25 | grams |
| crushed red pepper | 20 | grams |
| ground red pepper | 15 | grams |
| ground black pepper | 12 | grams |
| ground allspice | 16 | grams |
| melted butter or cooking oil | 28 | milliliters |

EXAMPLE 4

Approximately 2.72 kilograms of shelled shrimp are used with:

| cassava flour | 120 | grams |
| salt | 25 | grams |
| crushed red pepper | 20 | grams |
| ground red pepper | 114 | grams |
| ground black pepper | 12 | grams |
| ground allspice | 10 | grams |
| melted butter or cooking oil | 25 | milliliters |

In each of the foregoing examples, the dry ingredients are mixed together, forming a dry batter, and the food is coated therewith. It will be appreciated that variations in the amounts and types of spices may be made in accordance with taste, the most significant aspect of the recipe and method being the utilization of the cassava flour as the basic ingredient, and heating of the food after the coating has been applied, and prior to application of the melted butter or cooking oil.

The present invention may be embodied in other specific forms without departing from the spirit or essential attributes thereof, and accordingly, reference should be made to the appended claims, rather than to the foregoing specification as indicating the scope of the invention.

I claim:

1. A skewer, for cooking shish kabobs or the like, comprising:
a member having a cavity therein, the cavity having an opening at one end;
a spit mounted on the member, extending outwardly in a direction opposite the cavity opening; and,
a handle assembly, a portion of which forms an insert movably but lockably disposed within the cavity of the spit bearing member, the handle assembly and the spit bearing member being interfitted, but otherwise unconnected, and capable of relative interdependent movement.

2. The skewer of claim 1, wherein the cavity in the spit bearing member has laterally extending chambers, and the insert of the handle assembly comprises lateral projections extending into said cavity chambers.

3. The skewer of claims 1 or 2, wherein said handle assembly and said spit assembly are substantially flat.

4. The skewer of claim 1, wherein said handle assembly, said spit bearing member and said spit are formed from high temperature resistant plastic material.

* * * * *